(12) United States Patent
Robbins et al.

(10) Patent No.: US 8,672,348 B2
(45) Date of Patent: Mar. 18, 2014

(54) GAS-GENERATING DEVICES WITH GRAIN-RETENTION STRUCTURES AND RELATED METHODS AND SYSTEMS

(75) Inventors: Steven M. Robbins, West Haven, UT (US); William P. Sampson, North Ogden, UT (US)

(73) Assignee: Alliant Techsystems Inc., Arlington, VA (US)

( * ) Notice: Subject to any disclaimer, the term of this patent is extended or adjusted under 35 U.S.C. 154(b) by 820 days.

(21) Appl. No.: 12/478,019

(22) Filed: Jun. 4, 2009

(65) Prior Publication Data
US 2010/0307775 A1    Dec. 9, 2010

(51) Int. Cl.
*B60R 21/26*    (2011.01)
*C06B 45/00*    (2006.01)

(52) U.S. Cl.
USPC .................. 280/736; 280/728.1; 280/743.1; 149/2

(58) Field of Classification Search
USPC ...................................... 280/736, 741; 149/2
See application file for complete search history.

(56) References Cited

U.S. PATENT DOCUMENTS

| | | |
|---|---|---|
| 1,839,658 A | 1/1932 | Dugas |
| 2,744,816 A | 5/1956 | Hutchison |
| 2,841,227 A | 7/1958 | Betzler |
| 3,255,824 A | 6/1966 | Rodgers |
| 3,524,506 A | 8/1970 | Weise |
| 3,641,935 A | 2/1972 | Gawlick et al. |
| 3,701,256 A | 10/1972 | Pelham et al. |
| 3,741,585 A | 6/1973 | Hendrickson et al. |
| 3,806,461 A | 4/1974 | Hendrickson et al. |
| 3,836,076 A | 9/1974 | Conrad et al. |
| 3,972,545 A * | 8/1976 | Kirchoff et al. ............... 280/735 |
| 3,972,820 A | 8/1976 | Filter et al. |
| 4,064,944 A | 12/1977 | McClure et al. |
| 4,067,392 A | 1/1978 | Rich |
| 4,113,019 A | 9/1978 | Sobolev et al. |
| 4,224,994 A | 9/1980 | Tone et al. |
| 4,448,577 A | 5/1984 | Paczkowski |
| 4,505,336 A | 3/1985 | Thevis et al. |
| 4,601,344 A | 7/1986 | Reed, Jr. et al. |
| 4,616,694 A | 10/1986 | Hsieh |

(Continued)

FOREIGN PATENT DOCUMENTS

| | | |
|---|---|---|
| DE | 19546528 A1 | 6/1997 |
| DE | 19717044 A1 | 10/1997 |

(Continued)

OTHER PUBLICATIONS

Pyrogen, "The new revolution in fire suppression technology," International Aircraft Systems, Fire Protection Working Group, Atlantic City, NJ. Aug. 29, 2000, 43 pages.

(Continued)

*Primary Examiner* — Aileen B Felton
(74) *Attorney, Agent, or Firm* — TraskBritt (57) ABSTRACT

Gas-generating devices with grain-retention structures and related methods and systems are described. In particular, gas-generating devices having at least one retention structure fixed to a frame and positioned between adjacent gas-generant grains arranged in a longitudinal stack. Fire suppression systems comprising such gas-generating devices are also described. Additionally, methods of manufacturing gas-generating devices, as well as methods of generating a gas and methods of suppressing a fire utilizing such gas-generating devices are described.

20 Claims, 3 Drawing Sheets

(56) References Cited

U.S. PATENT DOCUMENTS

| | | | |
|---|---|---|---|
| 4,807,706 A | 2/1989 | Lambertsen et al. | |
| 4,817,828 A | 4/1989 | Goetz | |
| 4,890,860 A | 1/1990 | Schneiter | |
| 4,909,549 A | 3/1990 | Poole et al. | |
| 4,931,111 A | 6/1990 | Poole et al. | |
| 4,998,751 A * | 3/1991 | Paxton et al. | 280/741 |
| 5,035,757 A | 7/1991 | Poole | |
| 5,038,866 A | 8/1991 | Kern et al. | |
| 5,060,867 A | 10/1991 | Luxton et al. | |
| 5,423,384 A | 6/1995 | Galbraith et al. | |
| 5,425,886 A | 6/1995 | Smith | |
| 5,429,691 A | 7/1995 | Hinshaw et al. | |
| 5,439,537 A | 8/1995 | Hinshaw et al. | |
| 5,441,114 A | 8/1995 | Spector et al. | |
| 5,449,041 A | 9/1995 | Galbraith | |
| 5,495,893 A | 3/1996 | Roberts et al. | |
| 5,520,826 A | 5/1996 | Reed, Jr. et al. | |
| 5,531,941 A | 7/1996 | Poole | |
| 5,538,568 A | 7/1996 | Taylor et al. | |
| 5,542,704 A | 8/1996 | Hamilton et al. | |
| 5,544,687 A | 8/1996 | Barnes et al. | |
| 5,588,493 A | 12/1996 | Spector et al. | |
| 5,609,210 A | 3/1997 | Galbraith et al. | |
| 5,610,359 A | 3/1997 | Spector et al. | |
| 5,613,562 A | 3/1997 | Galbraith et al. | |
| 5,673,935 A | 10/1997 | Hinshaw et al. | |
| 5,725,699 A | 3/1998 | Hinshaw et al. | |
| 5,735,118 A | 4/1998 | Hinshaw et al. | |
| 5,739,460 A | 4/1998 | Knowlton et al. | |
| 5,762,145 A | 6/1998 | Bennett | |
| 5,783,773 A | 7/1998 | Poole | |
| 5,820,160 A | 10/1998 | Johnson et al. | |
| 5,845,716 A | 12/1998 | Birk | |
| 5,845,933 A | 12/1998 | Walker et al. | |
| 5,848,652 A | 12/1998 | Bennett | |
| 5,861,106 A | 1/1999 | Olander | |
| 5,865,257 A | 2/1999 | Kozyrev et al. | |
| 5,876,062 A | 3/1999 | Hock | |
| 5,882,036 A | 3/1999 | Moore et al. | |
| 5,884,710 A | 3/1999 | Barnes et al. | |
| 5,918,679 A | 7/1999 | Cramer | |
| 5,957,210 A | 9/1999 | Cohrt et al. | |
| 5,985,060 A | 11/1999 | Cabrera et al. | |
| 5,992,528 A | 11/1999 | Parkinson et al. | |
| 5,992,530 A | 11/1999 | Sundholm | |
| 5,996,699 A | 12/1999 | Sundholm | |
| 6,012,533 A | 1/2000 | Cramer | |
| 6,016,874 A | 1/2000 | Bennett | |
| 6,019,177 A | 2/2000 | Olander | |
| 6,019,861 A | 2/2000 | Canterberry et al. | |
| 6,024,889 A | 2/2000 | Holland et al. | |
| 6,039,820 A | 3/2000 | Hinshaw et al. | |
| 6,045,637 A | 4/2000 | Grzyll | |
| 6,045,638 A | 4/2000 | Lundstrom | |
| 6,065,774 A | 5/2000 | Cabrera | |
| 6,076,468 A | 6/2000 | DiGiacomo et al. | |
| 6,077,372 A | 6/2000 | Mendenhall et al. | |
| 6,082,464 A | 7/2000 | Mitchell et al. | |
| 6,086,693 A | 7/2000 | Mendenhall et al. | |
| 6,089,326 A | 7/2000 | Drakin | |
| 6,093,269 A | 7/2000 | Lundstrom et al. | |
| 6,095,559 A | 8/2000 | Smith et al. | |
| 6,096,147 A | 8/2000 | Taylor et al. | |
| 6,116,348 A | 9/2000 | Drakin | |
| 6,123,359 A | 9/2000 | Cabrera et al. | |
| 6,132,480 A | 10/2000 | Barnes et al. | |
| 6,136,114 A | 10/2000 | Johnson et al. | |
| 6,143,104 A | 11/2000 | Blomquist | |
| 6,202,755 B1 | 3/2001 | Hardge | |
| 6,217,788 B1 | 4/2001 | Wucherer et al. | |
| 6,224,099 B1 | 5/2001 | Nielson et al. | |
| 6,250,072 B1 | 6/2001 | Jacobson et al. | |
| 6,257,341 B1 | 7/2001 | Bennett | |
| 6,287,400 B1 | 9/2001 | Burns et al. | |
| 6,314,754 B1 | 11/2001 | Kotliar | |
| 6,328,906 B1 | 12/2001 | Lundstrom et al. | |
| 6,334,315 B1 | 1/2002 | Kotliar | |
| 6,371,384 B1 | 4/2002 | Garcia | |
| 6,401,487 B1 | 6/2002 | Kotliar | |
| 6,416,599 B1 | 7/2002 | Yoshikawa et al. | |
| 6,418,752 B2 | 7/2002 | Kotliar | |
| 6,435,552 B1 | 8/2002 | Lundstrom et al. | |
| 6,474,684 B1 | 11/2002 | Ludwig et al. | |
| 6,481,746 B1 | 11/2002 | Hinshaw et al. | |
| 6,502,421 B2 | 1/2003 | Kotliar | |
| 6,513,602 B1 | 2/2003 | Lewis et al. | |
| 6,557,374 B2 | 5/2003 | Kotliar | |
| 6,560,991 B1 | 5/2003 | Kotliar | |
| 6,599,380 B2 | 7/2003 | Zeuner et al. | |
| 6,601,653 B2 | 8/2003 | Grabow et al. | |
| 6,605,233 B2 | 8/2003 | Knowlton et al. | |
| 6,612,243 B1 | 9/2003 | Italiane et al. | |
| 6,634,433 B2 | 10/2003 | Kim et al. | |
| 6,739,399 B2 | 5/2004 | Wagner et al. | |
| 6,851,483 B2 | 2/2005 | Olander et al. | |
| 6,935,433 B2 | 8/2005 | Gupta | |
| 6,942,249 B2 | 9/2005 | Iwai et al. | |
| 6,990,905 B1 | 1/2006 | Manole et al. | |
| 7,028,782 B2 | 4/2006 | Richardson | |
| 7,156,184 B2 | 1/2007 | Wagner | |
| 7,337,856 B2 | 3/2008 | Lund et al. | |
| 7,455,120 B2 | 11/2008 | Richardson et al. | |
| 7,845,423 B2 | 12/2010 | Lund | |
| 8,162,350 B1 | 4/2012 | Parkinson et al. | |
| 2002/0007886 A1 | 1/2002 | Neidert et al. | |
| 2002/0020536 A1 | 2/2002 | Bennett | |
| 2002/0137875 A1 | 9/2002 | Reed et al. | |
| 2002/0195181 A1 | 12/2002 | Lundstrom | |
| 2004/0173922 A1 | 9/2004 | Barnes | |
| 2005/0115721 A1 | 6/2005 | Blau et al. | |
| 2005/0139365 A1 | 6/2005 | Richardson | |
| 2005/0257866 A1 | 11/2005 | Williams et al. | |
| 2006/0278409 A1 | 12/2006 | Blau | |
| 2008/0128145 A1 | 6/2008 | Butz et al. | |
| 2010/0170684 A1 | 7/2010 | Richardson et al. | |
| 2011/0226493 A1 | 9/2011 | Blau et al. | |
| 2012/0085556 A1 | 4/2012 | Cox et al. | |

FOREIGN PATENT DOCUMENTS

| | | |
|---|---|---|
| EP | 0784998 A2 | 7/1997 |
| EP | 0956883 A1 | 11/1999 |
| EP | 1767248 A1 | 3/2007 |
| GB | 1219363 A | 1/1971 |
| JP | 5248640 | 11/1977 |
| JP | 09500296 | 1/1997 |
| JP | 2001518046 A | 10/2001 |
| JP | 2001346898 | 12/2001 |
| JP | 2002160992 A | 6/2002 |
| WO | 9315793 | 8/1993 |
| WO | 9500205 A1 | 1/1995 |
| WO | 9846529 A1 | 10/1998 |
| WO | 99/01180 A2 | 1/1999 |
| WO | 0006424 A1 | 2/2000 |
| WO | 00/15305 A1 | 3/2000 |
| WO | 03024534 A1 | 3/2003 |
| WO | 2004028642 A1 | 4/2004 |
| WO | 2004091729 A1 | 10/2004 |

OTHER PUBLICATIONS

Berezovsky, "Pyrogen, A Revolution in Fire Suppression Technology?", Fire Safety Engineering, vol. 5, No. 5, Oct. 1998, pp. 30-32.

Annex to Form PCT/ISA/206, Communication Relating to the Results of the Partial International Search, mailed Jun. 24, 2005.

Ebeling, Hans, et al., "Development of Gas Generators for Fire Extinguishing," Propellants, Explosives, Pyrotechnics, vol. 22, pp. 170-175, 1997.

Engelen, K., et al., "Pyrotechnic Propellant for Nitrogen Gas Generator," Bull. Soc. Chim Belg., vol. 106, No. 6, pp. 349-354, 1997.

Fallis, Stephen, et al., "Advanced Propellant/Additive Development for Fire Suppressing Gas Generators: Development + Test," Proceedings of HOTWC-2002 12th Halon Options Technical Working Con- (56) References Cited

OTHER PUBLICATIONS ference, Albuquerque, NM, Apr. 20-May 2, 2002, National Institute of Standards and Technology Special Publication 984.

Fletcher M., "Fighting Fire with Fire," Eureka (Inc. Engineering Materials and Design), Findlay Publications, Horton Kirby, Kent, GB, vol. 20, No. 1, Jan. 2000, p. 17, XP000877927, ISSN: 0261-2097.

Mitchell, Robert M., Olin Aerospace Company, Report on Advanced Fire Suppression Technology (AFST) Research and Development Program, 52 pages, Report Date Sep. 1994.

Palaszewski, Bryan A., NASA Glenn Research Center, Safer Aircraft Possible with Nitrogen Generation, 2 pages, Mar. 2001.

PCT International Preliminary Examination Report, dated Jan. 17, 2005.

PCT International Search Report dated Mar. 17, 2005.

PCT International Search Report mailed Nov. 23, 2006.

Saito, Naoshi, et al., "Flame-extinguishing Concentrations and Peak Concentrations of N2, Ar, Co2 and their Mixtures for Hydrocarbon Fuels," Fire Safety Journal, vol. 27, pp. 185-200, 1996.

Schmid, Helmut, et al., "Gas Generator Development for Fire Protection Purpose," Propellants, Explosives, Pyrotechnics, vol. 24, pp. 144-148, 1999.

TNO Defence, Security and Safety, "Solid Propellant Cool Gas Generators," 2 pages, unknown publication date.

U.S. Appl. No. 60/414,157, filed Sep. 28, 2002, to Joseph Michael Bennett, entitled, "In-Room Gas Generator Fire Protection System."

"Water Mist-Fire-Suppression Experiment," NASA Glenn Research Center, Dec. 2001, 3 pages.

Yang, Jiann C., et al., "Solid Propellant Gas Generators: An Overview and Their Application to Fire Suppression," International Conference on Fire Research and Engineering, Sep. 10-15, 1995, Orlando, FL, 3 pages.

\* cited by examiner

GAS-GENERATING DEVICES WITH GRAIN-RETENTION STRUCTURES AND RELATED METHODS AND SYSTEMS

CROSS-REFERENCE TO RELATED APPLICATIONS

The present application is related to U.S. patent application Ser. No. 11/409,257 entitled MAN-RATED FIRE SUPPRESSION SYSTEM, filed Apr. 21, 2006, now U.S. Pat. No. 8,408,322, issued Apr. 2, 2013; U.S. patent application Ser. No. 10/727,088 entitled MAN-RATED FIRE SUPPRESSION SYSTEM, filed Dec. 2, 2003, now abandoned; U.S. patent application Ser. No. 10/727,093 entitled METHOD AND APPARATUS FOR SUPPRESSION OF FIRES, filed Dec. 2, 2003, now U.S. Pat. No. 7,337,856, issued Mar. 4, 2008; and U.S. patent application Ser. No. 12/042,200 entitled METHOD AND APPARATUS FOR SUPPRESSION OF FIRES, filed Mar. 4, 2008, now U.S. Pat. No. 7,845,423, issued Dec. 7, 2010, the disclosures of all of which are incorporated by reference herein in their entirety.

TECHNICAL FIELD

The invention relates to gas-generating devices with grain-retention structures and related methods and systems. In particular, the invention relates to gas-generating devices having at least one retention structure positioned between gas-generant grains. The invention also relates to fire suppression systems comprising such gas-generating devices. Additionally, the invention relates to methods of manufacturing gas-generating devices, as well as methods of generating a gas and methods of suppressing a fire utilizing such gas-generating devices.

BACKGROUND

Gas-generating devices that utilize gas-generating grains are often used in the automotive industry for passenger restraint systems, such as for inflators for airbag modules. Additionally, new methods and devices for suppressing fires using gas-generating devices that utilize gas-generating grains have been disclosed in the aforementioned U.S. patent application Ser. No. 11/409,257 entitled MAN-RATED FIRE SUPPRESSION SYSTEM, filed on Apr. 21, 2006, now U.S. Pat. No. 8,408,222.

The following discussion relates to the environment in which embodiments of the present invention may be beneficially employed, and does not constitute Admitted Prior Art.

As gas generators are made larger, such as to produce larger amounts of gas, the inventors of the present invention discovered several issues. For example, as gas-generating grains are produced in a larger scale the reliability of the grains becomes an issue. Specifically, larger gas-generating grains tend to have an unpredictable burn rate and have an inconsistent gas production throughout the burn, as well as having other undesirable burn characteristics. Additionally, larger gas-generating grains tend to develop cracks and other structural defects that contribute to the unreliability of these larger grains and the undesirable burn characteristics of such larger grains.

Instead of a single larger grain, a plurality of smaller gas-generating grains in a single gas generator improve the reliability of the gas generator, and provide relatively predictable burn rates and relatively consistent gas production throughout the burn. However, the inventors of the present invention discovered that the interaction between the smaller, burning gas-generating grains within the gas generator has undesirable effects on the gas generator performance.

Figure 1:
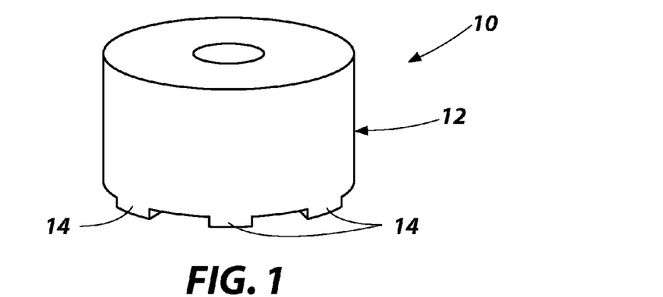
FIG. 1 shows a pictorial view of a gas-generant grain.
Figure 2A:
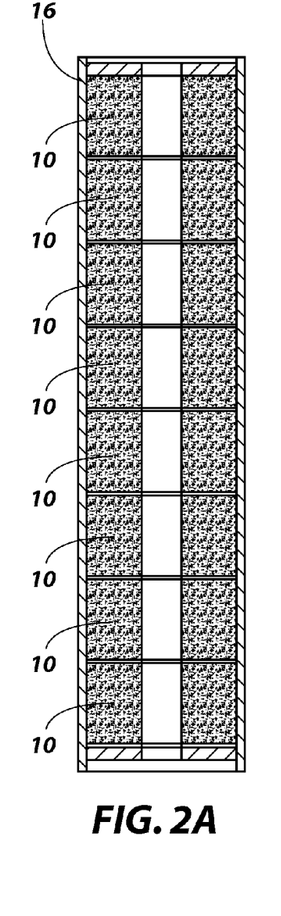
FIG. 2A shows a cross-sectional view of a gas-generating device with a plurality of gas-generant grains, such as shown in FIG. 1.
Figure 2B:
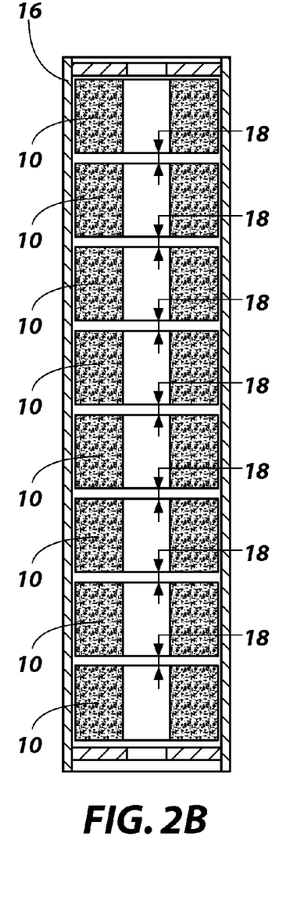
FIG. 2B shows a cross-sectional view of the gas-generating device shown in FIG. 2A after the gas-generant grains have experienced some mass loss due to gas generation and gaps have formed between gas-generant grains.

As shown in FIG. 1, a gas-generating grain 10 may have a generally annular shaped body 12 and include a plurality of protrusions 14 on a surface that may act as a "stand-off." A plurality of grains 10 may be arranged within a sleeve 16 in a longitudinal stack, and the protrusions 14 may maintain a space between adjacent grains of the plurality of grains 10, as shown in FIG. 2A. As the grains 10 burn, the entire exposed surface of each grain 10 may combust to generate a gas. Also, as the plurality of grains 10 burns and produces gas, the size and mass of each grain 10 is reduced, as shown in FIG. 2B, and gaps 18 may be formed between adjacent grains 10.

Figure 2C:
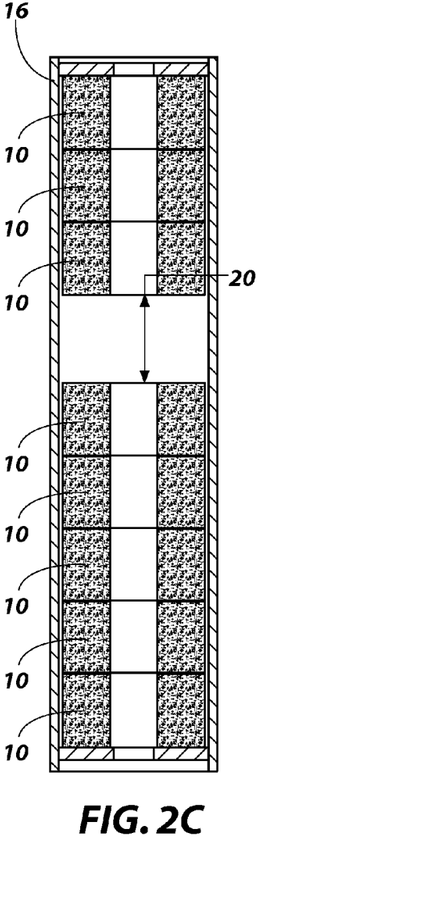
FIG. 2C shows a cross-sectional view of the gas-generating device of FIG. 2B after the gas-generant grains have moved within the gas-generating device and a relatively large gap has formed.

As shown in FIG. 2C, the burning grains 10 may be accelerated in different directions during the combustion and gas-generating process and relatively large gaps 20 may result. As the burning grains 10 continue to be accelerated in various directions, the grains 10 may collide with surrounding structures and adjacent grains 10. As larger gaps 20 may form, the grains 10 may be accelerated over a greater distance, resulting in higher velocities. The collisions at such higher velocities may be relatively energetic and may result in material of the grains 10, particularly spent material of the grains 10 or so called "clinkers," breaking apart, which may result in the production of particulates. This production of particles may be undesirable, as the gas-generating grains 10 may be enclosed within a combustion chamber of a gas-generating assembly (not shown), and as particulates are carried through the gas-generating assembly they may foul a filter of the assembly and reduce gas flow and/or may be carried out of the gas-generating assembly. The particulates that may be carried out of the gas-generating assembly may be undesirable. Additionally, excessive smoke and undesirable combustion products may result and may also be expelled from the gas-generating assembly.

BRIEF SUMMARY OF THE INVENTION

Embodiments of the present invention relate to gas-generating devices that comprise a plurality of gas-generant grains, a frame, and at least one retention plate. The gas-generant grains may be constrained to a longitudinally stacked configuration by the frame. Each retention plate may be coupled to the frame, fixed relative to the frame, and positioned between at least one gas-generant grain and at least one adjacent gas-generant grain of the plurality of gas-generant grains.

Embodiments of the present invention also relate to gas-generating devices that comprise a plurality of longitudinally stacked gas-generant grains, a frame, and at least one retention structure coupled to the frame and positioned between adjacent gas-generant grains of the plurality of longitudinally stacked gas-generant grains. Each retention member may be sized and configured to remain fixed to the frame and constrain the longitudinal position of the adjacent gas-generant grains relative to the frame as the adjacent gas-generant grains generate gas.

Additionally, embodiments of the present invention relate to fire suppression systems, and other applications requiring multiple grains in a larger gas generator, that comprise at least one combustion chamber, at least one effluent train coupled to each combustion chamber, and at least one gas-generating device located within each combustion chamber. Each gas-generating device may comprise a plurality of fire-suppressing gas-generant grains constrained to a longitudinally stacked configuration by a frame. One or more retention plates may be coupled to the frame, fixed relative to the frame, and positioned between at least some adjacent gas-generant grains of the plurality of fire-suppressing gas-generant grains.

In accordance with one embodiment of the present invention, a gas generator may be manufactured by arranging a plurality of gas-generant grains in a longitudinal stack. One or more retaining members may be positioned between at least one gas-generant grain and at least one adjacent gas-generant grain of the plurality of gas-generant grains in the longitudinal stack, and each retaining member may be fixed to the frame.

In accordance with another embodiment of the present invention, a gas may be generated by combusting a plurality of longitudinally stacked gas-generant grains to generate a gas. Lateral movement of at least some of the plurality of longitudinally stacked gas-generant grains may be restricted during combustion with a frame structure, and longitudinal movement of the plurality of longitudinally stacked gas-generant grains may be restricted during combustion by maintaining at least one retaining member between adjacent gas-generant grains of the plurality of longitudinally stacked gas-generant grains and maintaining the one or more retaining members fixed relative to the frame during combustion.

DETAILED DESCRIPTION

Figure 3A:
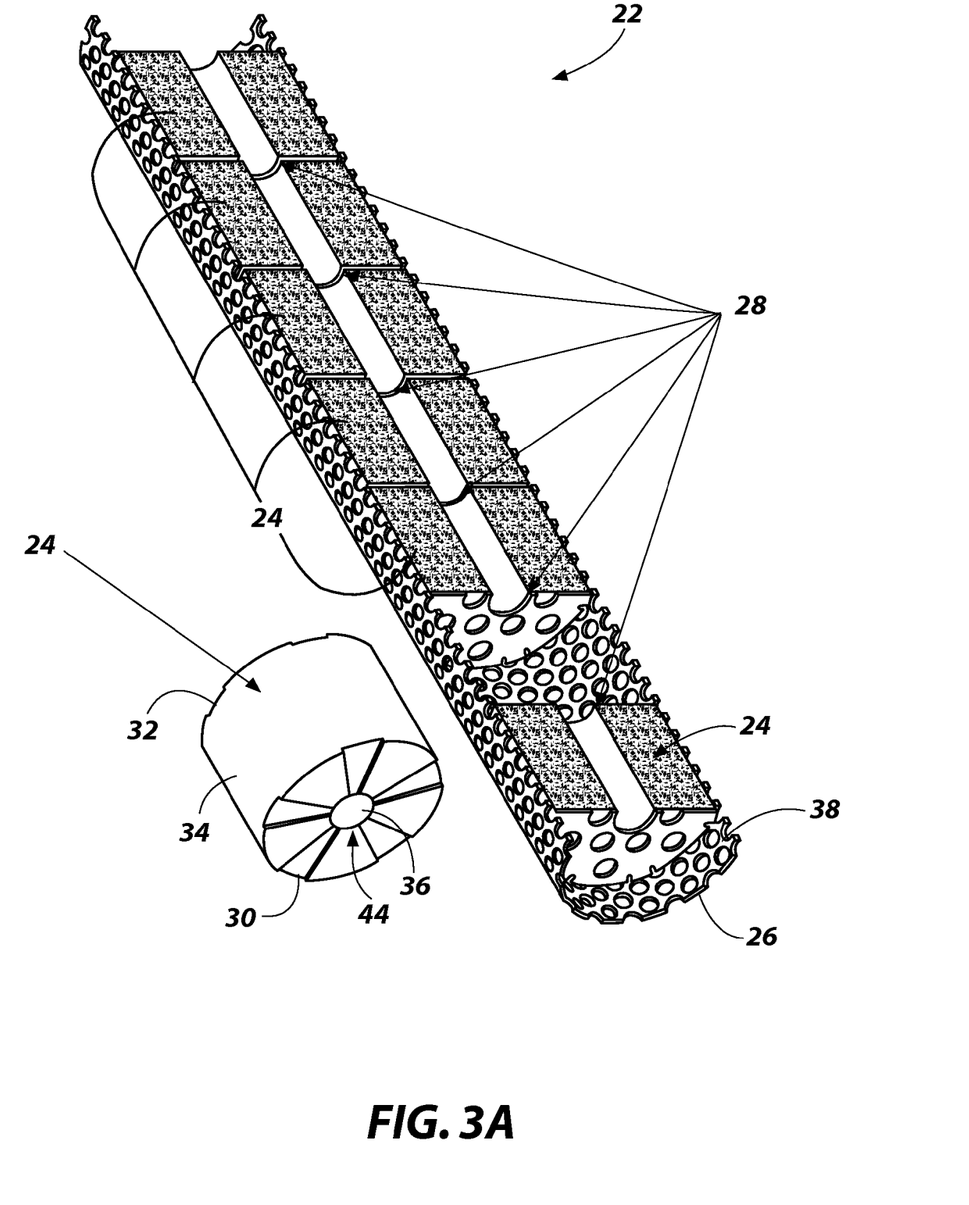
FIG. 3A shows a pictorial cutaway view of a gas-generating device according to an embodiment of the invention with a full gas-generant grain removed from a longitudinal stack of gas-generant grains to better show a retention plate located between gas-generant grains of the longitudinal stack.
Figure 3B:
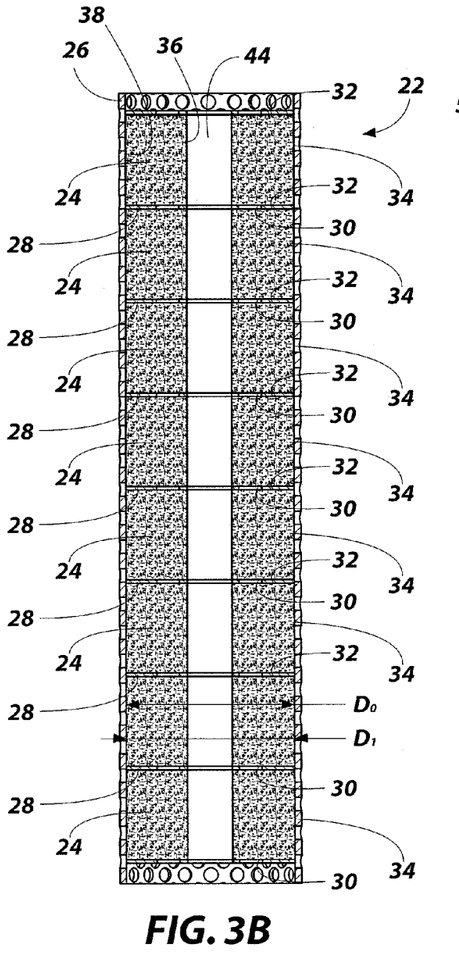
FIG. 3B shows a cross-sectional view of the gas-generating device of FIG. 3A.

A gas-generating device 22 according to an embodiment of the present invention is shown in FIGS. 3A and 3B. The gas-generating device 22 may include a plurality of gas-generant grains 24, a frame, such as a sleeve 26, and at least one retention structure, such as a retention plate 28. The plurality of gas-generant grains 24 may be constrained to a longitudinally stacked configuration by the sleeve 26 and each retention plate 28 may be coupled to the sleeve 26 and positioned between adjacent gas-generant grains 24 of the plurality of gas-generant grains 24. The gas-generating device 22 may be located within a combustion chamber of a gas-generating assembly (not shown), which may include an igniter and may be coupled to an effluent train.

Each gas-generant grain 24 may be substantially cylindrical or annular in shape. Accordingly, each grain 24 may include a substantially planar first end surface 30, a substantially planar second end surface 32, a generally arcuate outer surface 34 and a generally arcuate inner surface 36. Optionally, the first and/or second end surfaces 30 and 32 of each gas-generant grain 24 may comprise protrusions, or another stand-off structure, formed thereon, such as the protrusions 14 of the gas-generant grain 10 shown in FIG. 1. The gas-generant grains 24 may be arranged in a stacked configuration, wherein the outer surfaces 34 of each gas-generant grain 24 may be generally aligned with the outer surfacess 34 of another gas-generant grain 24 and wherein at least one of the first and second end surfaces 30 and 32 of each grain 24 may be adjacent to one of the first and second end surfaces 30 and 32 of another grain 24.

The sleeve 26 may be a substantially annular elongated sleeve 26 formed from a gas permeable material, such as a perforated metal sheet. For example, the sleeve 26 may be formed from a perforated steel sheet and may be shaped as a perforated steel pipe or tube. Additionally, the sleeve 26 may have a bore 38 sized and shaped to substantially conform to an outer surface 34 of each gas-generant grain 24 of the plurality of gas-generant grains 24. For example, the bore 38 may be substantially cylindrical in shape. A diameter $D_0$ of the bore 38 may be sized similar to the outer diameter $D_1$ of each gas-generant grain 24, or may be sized slightly larger (such as less than about 10% larger) than the outer diameter $D_1$ of each gas-generant grain 24.

Figure 4:
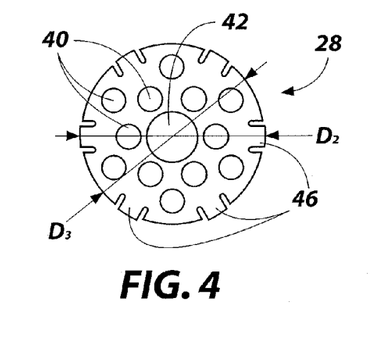
FIG. 4 shows a top view of a retention plate, such as used in the gas-generating device of FIGS. 3A and 3B.

Each retention plate 28 may comprise a perforated metal sheet and may be generally shaped like a disc, or may be otherwise shaped similarly to a cross-sectional shape of at least one of the sleeve 26 and the grains 24, such as shown in FIG. 4. Each retention plate 28 may be positioned between adjacent grains 24 in the longitudinal stack. A retention plate 28 may be located between each adjacent grain 24, as shown in FIG. 3B, or may be located at intervals. For example, a retention plate 28 may be located between every other grain 24. In additional embodiments, the retention plates 28 may be located at some other uniform interval, or optionally a non-uniform interval. The positioning of a perforated retention plate 28 between adjacent grains 24 may provide a gap between adjacent grains 24 and provide communication between adjacent grains 24 through the perforations. In view of this arrangement, grains may or may not include stand-offs when retention plates are positioned between adjacent grains.

As shown in FIG. 4, each retention plate 28 may include a plurality of apertures 40 or perforations therein, and may include a large central aperture 42 that may correspond to a central aperture of each grain 24, such as a central aperture 42 that may correspond to a central aperture of each grain, such as a central aperture 44 defined by the inner surface 36 of each grain 24 as shown in FIGS. 3A and 3B. Each retention plate 28 may be sized and configured to remain fixed to the frame, such as the sleeve 26, and constrain the longitudinal position of the adjacent gas-generant grains 24 relative to the sleeve 26 when the adjacent gas-generant grains 24 generate gas. For example, each retention plate 28 may be sized with a diameter $D_2$ larger than a diameter $D_0$ of the bore 38 of the sleeve 26. Accordingly, each retention plate 28 may be pressed into the sleeve 26 and may be coupled to the sleeve 26 by an interference fit. The interference fit may fasten the retention plate 28 to the sleeve 26 by friction, which may be significantly increased by the compression of the retention plate 28 by the sleeve 26. The sleeve 26 and the retention plate 28 may be formed of a material having sufficient tensile and compressive strength, and the retention plate 28 may be sized relative to the sleeve 26, to provide sufficient friction to fix the retention plate 28 relative to the sleeve 26 and prevent the longitudinal movement of the retention plate 28 relative to the sleeve 26 during the combustion of the gas-generant grains 24. In some embodiments, the retention plate 28 may include cantilevered members 46 where the diameter $D_2$ may exceed the diameter $D_0$ of the bore 38 of the sleeve 26. Additionally, the cantilevered members 46 may extend beyond a general diameter $D_3$ of the retention plate 28, as shown in FIG. 4. Upon insertion into the sleeve 26, an interference fit may be provided between the cantilevered members 46 and the sleeve 26. In additional embodiments, the retention plate 28 may not include cantilevered members 46 and the general diameter $D_3$ of the retention plate 28 may be larger than the diameter $D_0$ of the bore 38 of the sleeve 26 and an interference fit may be provided between the sleeve 26 and substantially the entire outer surface of the retention plate 28. In yet additional embodiments, the sleeve 26 may include surface features within the bore 38, such as helical threads, protrusions and/or annular grooves (not shown), that may correspond to surface features at the periphery of each retention plate 28 that may be utilized to longitudinally fix the retention plate 28 relative to the sleeve 26.

Figure 5:
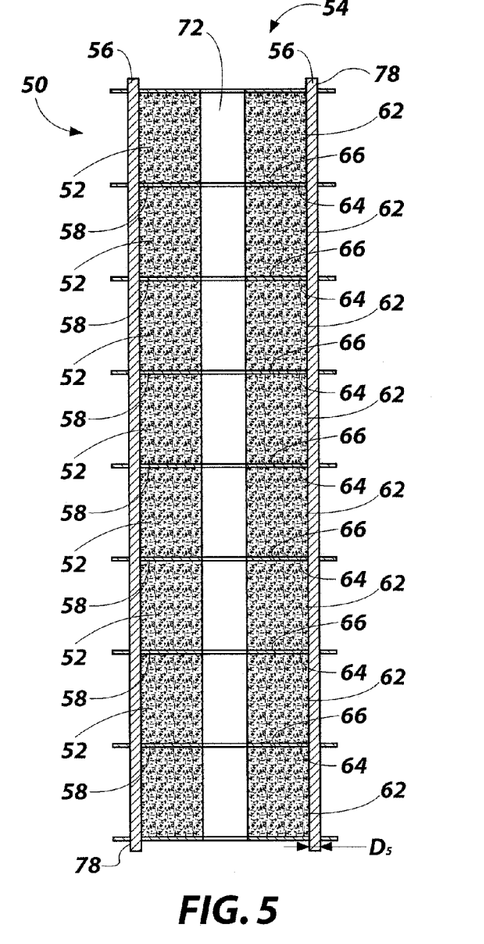
FIG. 5 shows a cross-sectional view of a gas-generating device having retention plates located between gas-generant grains according to another embodiment of the invention.

An additional embodiment of a gas-generating device 50 according to the present invention is shown in FIG. 5. The gas-generating device 50 may include a plurality of gas-generant grains 52, a frame 54, which may comprise a plurality of rods 56, and at least one retention structure, such as a retention plate 58. The plurality of gas-generant grains 52 may be constrained to a longitudinally stacked configuration by the longitudinally extending rods 56 of the frame 54 and each laterally oriented retention plate 58 may be coupled to one or more rods 56 of the frame 54 and positioned between adjacent gas-generant grains 52 of the plurality of gas-generant grains 52.

Each gas-generant grain 52 may be sized and shaped similar to the gas-generant grains 24 described with reference to FIGS. 3A and 3B. The gas-generant grains 52 may be arranged in a stacked configuration, wherein the outer surfaces 62 of each gas-generant grain 52 may be generally aligned with an outer surface 62 of another gas-generant grain 52 and wherein at least one of a first surface 64 and second surface 66 of each grain 52 may be adjacent one of the first surface 64 and second surfaces 66 of another grain 52. Additionally, the rods 56 may be placed circumferentially to surround each gas-generant grain 52 and may be positioned adjacent to each gas-generant grain 52, such that lateral movement of the gas-generant grains 52 may be restricted by the rods 56.

As shown in FIG. 5, the rods 56 may have an elongated, generally cylindrical shape and may be formed from a generally rigid and heat resistant material, such as steel or another suitable metal. In additional embodiments, the rods 56 may have another elongated shape and may have a cross-section that may comprise any number of shapes.

Figure 6:
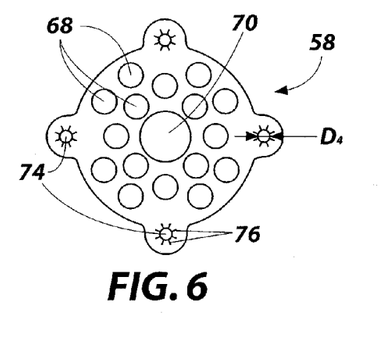
FIG. 6 shows a top view of a retention plate, such as used in the gas-generating device of FIG. 5.

At least one retention structure, such as retention plates 58, may be positioned between adjacent gas-generant grains 52 of the longitudinally stacked plurality of gas-generant grains 52. The retention plates 58 may be similar to the retention plates 28 described with reference to FIG. 4; however, the retention plates 58 may be sized and configured to couple and be fixed to the rods 56 of the frame 54, rather than a sleeve 26 (FIGS. 3A and 3B). As shown in FIG. 6, each retention plate 58 may include a plurality of apertures 68 or perforations therein, and may include a large central aperture 70 that may correspond to a central aperture 72 of each grain 52. Each retention plate 58 may be sized and configured to remain fixed to the frame 54 and constrain the longitudinal position of the adjacent gas-generant grains 52 relative to the frame 54 when the adjacent gas-generant grains 52 generate gas. For example, each retention plate 58 may be sized with one or more coupling apertures 74 having a dimension $D_4$ smaller than a dimension $D_5$ of the rods 56 of the frame 54. The coupling apertures 74 may include one or more relief cuts 76, which may facilitate an elastic deformation of the retention plate 58 proximate each coupling aperture 74. Accordingly, the coupling apertures 74 of each retention plate 58 may be aligned with the rods 56 of the frame 54 and each retention plate 58 may be pressed onto the rods 56 and may be coupled to the rods 56 by an interference fit. The interference fit may fasten each retention plate 58 to the rods 56 by friction, in a manner similar to that described with reference to the retention plates 28 and sleeve 26 described with reference to FIGS. 3A, 3B and 4. For example, regions of the retention plate 58 proximate each coupling aperture 74 may be elastically deformed by ran outer surface 78 of each rod 56 and enhance the friction between the retention plate 58 and the rods 56. Accordingly, the friction between the retention plates 58 and the rods 56 of the frame 54 may be sufficient to prevent longitudinal movement of the retaining plates 58 relative to the frame 54 while the grains 52 combust to generate gas. In additional embodiments, the rods 56 may include surface features, such as grooves, protrusions, and/or helical threads (not shown), that may couple with corresponding features of each retention plate 58 and longitudinally fix each retention plate 58 relative to the rods 56.

Methods of manufacturing a gas generator, such as gas-generating devices 22 and 50, may comprise arranging a plurality of gas-generant grains, such as gas-generant grains 24 or 52, in a longitudinal stack, positioning at least one retaining member, such as retention plates 28 or 58, between adjacent grains of the plurality of gas-generant grains 24 or 52 in the longitudinal stack, and fixing the at least one retaining member to the frame, such as to the rods 56 or the sleeve 26.

For example, an elongated frame, such as the sleeve 26, may be provided and positioned to align with a plunger, such as a plunger attached to a press ram. A gas-generant grain 24 may be aligned with the sleeve 26, for example, the arcuate outer surface 34 of the gas-generant grain 24 may be aligned with the bore 38 of the sleeve 26, and the grain 24 may be positioned at a longitudinal position within the sleeve 26 by applying a force to the grain 24 with the plunger. A retaining member, such as the retention plate 28, may then be positioned adjacent a surface of the gas-generant grain 24 within the sleeve 26 and fixed to the sleeve 26. The retention plate 28 may be aligned with the sleeve 26 and pressed with the plunger, such as with the assistance of a mechanical or hydraulic press, into the sleeve 26 and positioned adjacent to the second end surface 32 of the gas-generant grain 24, and the size and configuration of the retention plate 28 relative to the sleeve 26 may provide an interference fit to fix the retention plate 28 to the sleeve 26.

After the first gas-generant grain 24 is inserted into the sleeve 26 and the first retention plate 28 has been positioned adjacent to the first gas-generant grain 24 and fixed to the sleeve 26, another gas-generant grain 24 may be aligned with the sleeve 26, similarly to the first gas-generant grain 24. The second grain 24 may be positioned at another longitudinal position within the sleeve 26, and a first end surface 30 of the second gas-generant grain 24 may be located adjacent to the first retention plate 28, by applying a force to the second grain 24 with the plunger. Then another retention plate 28 may be positioned adjacent to the second end surface 32 of the second gas-generant grain 24 within the sleeve 26 and fixed to the sleeve 26 in a manner similar to the positioning and affixation of the first retention plate 28. This method may be repeated until the required number of grains 24 has been assembled into the sleeve 26.

Gas-generating devices according to the present invention, such as gas-generating devices 22 and 50 described herein, may generate a gas by a chemical reaction that may convert solid chemicals in the gas-generating grains 24 and 52 into a gas. For example, gas-generant grains 24 and 52 may combust and form gaseous combustion products. An igniter, such as an electronic igniter (not shown), may be actuated to initiate a chemical reaction or otherwise cause the gas-generant grains 24 and 52 to combust and generate the gas. While the grains combust, thrust forces may be generated and act upon the grains, and the frame, such as the frame 54 or sleeve 26, and at least one retaining member, such as the retention plates 28 and 58, may resist these forces and restrict the movement of the grains 24 and 52. The frame 54 and sleeve 26 may be maintained in a fixed position and may be utilized to physically restrict the lateral movement of each of the longitudinally stacked gas-generant grains 24 and 52 and maintain the lateral position of each grain 24 and 52 during combustion of the grains 24 and 52. Additionally, the retention plates 28 and 58 may be maintained at a fixed longitudinal location relative to the frame 54 and sleeve 26 and maintained between adjacent gas-generant grains 24 and 52 of the plurality of longitudinally stacked gas-generant grains 24 and 52 during combustion of the grains 24 and 52. In view of this, each retention plate 28 and 58 may remain fixed relative to the frame 54 and sleeve 26 and restrict the longitudinal movement of adjacent gas-generant grains 24 and 52 as the grains 24 and 52 combust.

In some embodiments, the gas-generating devices 22 and 50 and methods as described herein may be part of a fire suppression system, such as is disclosed in the aforementioned U.S. patent application Ser. No. 11/409,257 entitled MAN-RATED FIRE SUPPRESSION SYSTEM, filed on Apr. 21, 2006, now U.S. Pat. No. 8,408,322. Accordingly, the gas-generating grains 24 and 52 may generate a fire-suppressing gas that may be directed out of a combustion chamber and through an effluent train into a space containing a fire (not shown). The fire-suppressing gas may flood the space and/or may be metered into the space and the fire may be suppressed. For example, the fire-suppressing gas may replace previously available oxygen-containing gas and may deprive the fire of the oxygen required for combustion, and/or the fire-suppressing gas may otherwise interfere with the combustion reaction of the fire and suppress the fire. However, it may be understood that embodiments of the present invention may also be used for any number of other types of gas-generating assemblies having a variety of uses.

While the invention may be susceptible to various modifications and alternative forms, specific embodiments of which have been shown by way of example in the drawings and have been described in detail herein, it should be understood that the invention is not intended to be limited to the particular forms disclosed. Rather, the invention includes all modifications, equivalents, and alternatives falling within the scope of the invention as defined by the following appended claims and their legal equivalents.

What is claimed is:

1. A gas-generating device comprising:
   a plurality of gas-generant grains arranged in a longitudinally extending stack and constrained to a longitudinally stacked configuration by a frame; and
   a plurality of retention plates coupled to the frame and fixed relative to the frame, each retention plate of the plurality positioned between one adjacent gas-generant grain of the plurality of gas generant grains and another adjacent gas-generant grain of the plurality of gas-generant grains in the longitudinally extending stack.

2. The gas-generating device of claim 1, wherein the retention plates each comprise a generally disc-shaped perforated metal sheet.

3. The gas-generating device of claim 2, wherein the frame comprises a sleeve having a bore sized and shaped to substantially conform to an outer surface of each gas-generant grain of the plurality of longitudinally stacked gas-generant grains and wherein each of the plurality of gas-generant grains and the plurality of retention plates are positioned within the bore of the sleeve.

4. The gas-generating device of claim 3, wherein the sleeve comprises a perforated metal pipe or tube.

5. The gas-generating device of claim 4, wherein an outer diameter of each of the plurality of retention plates is larger than an inner diameter of the bore of the sleeve and wherein each retention plate of the plurality of retention plates is positioned within the bore such that each retention plate of the plurality of retention plates is compressed by a bore wall of the sleeve forming an interference fit between each retention plate of the plurality of retention plates and the sleeve.

6. The gas-generating device of claim 5, wherein each retention plate of the plurality of retention plates comprises a plurality of cantilevered members and wherein an outer diameter of the plurality of cantilevered members prior to positioning thereof in the bore of the sleeve is larger than the inner diameter of the bore of the sleeve.

7. The gas-generating device of claim 1, wherein the frame comprises at least one rod and wherein each retention plate of the plurality of retention plates is coupled to the at least one rod and fixed to the at least one rod.

8. The gas-generating device of claim 7, wherein each retention plate of the plurality of retention plates comprises a perforated metal sheet including at least one guide aperture having a dimension smaller than a dimension of an outer surface of the at least one rod and wherein the at least one rod is positioned within the at least one guide aperture such that a region of the perforated metal sheet surrounding the at least one guide aperture is compressed by the outer surface of the at least one rod and forms an interference fit between each retention plate of the plurality of retention plates and the at least one rod.

9. The gas-generating device of claim 1, wherein each retention plate of the plurality of retention plates has a shape similar to a shape of a cross-section of each gas-generant grain of the plurality of gas-generant grains.

10. A gas-generating device comprising:
    longitudinally stacked gas-generant grains;
    a frame constraining the gas-generant grains to a longitudinally stacked configuration; and
    retention structures coupled to the frame, each retention structure positioned between adjacent gas-generant grains, the retention structures sized and configured to remain fixed to the frame and constrain the longitudinal position of the adjacent gas-generant grains relative to the frame as the adjacent gas-generant grains in the longitudinal stack generate gas.

11. The gas-generating device of claim 10, wherein the retention structures are positioned between two gas-generant grains of the longitudinally stacked gas-generant grains.

12. The gas-generating device of claim 10, further comprising an interference fit coupling the retention structures to the frame.

13. A fire suppression system comprising:
at least one combustion chamber;
at least one effluent train coupled to the at least one combustion chamber; and
at least one gas-generating device located within the at least one combustion chamber, the at least one gas-generating device comprising:
a plurality of gas-generant grains arranged in a longitudinal stack and constrained to a longitudinally stacked configuration by a frame; and
a plurality of retention plates coupled to the frame and fixed relative to the frame, each retention plate of the plurality positioned between one adjacent gas-generant grain and another adjacent gas-generant grain of the plurality of gas-generant grains in the longitudinal stack.

14. A method of manufacturing a gas generator, the method comprising:
arranging a plurality of gas-generant grains in a longitudinal stack;
positioning retaining members between an adjacent gas-generant grain and another adjacent gas-generant grain of the plurality of gas-generant grains in the longitudinal stack;
constraining the plurality of gas-generant grains to a longitudinally stacked configuration using a frame; and
fixing the retaining members to the frame.

15. The method of claim 14, further comprising aligning a feature of each gas-generant grain with a retaining feature of the frame.

16. The method of claim 15, wherein aligning a feature of each gas-generant grain with a retaining feature of the frame comprises aligning an arcuate outer surface of each gas-generant grain with a bore of a sleeve.

17. The method of claim 15, wherein aligning a feature of each gas-generant grain with a retaining feature of the frame comprises aligning at least one aperture of each gas-generant grain with at least one rod.

18. The method of claim 15, further comprising:
sliding a feature of a first gas-generant grain along the retaining feature of the frame to position the first gas-generant grain at a first longitudinal position relative to the frame;
sliding a first retaining member to a second longitudinal position relative to the frame adjacent a surface of the first gas-generant grain;
fixing the first retaining member to the frame at the second longitudinal position by compressing at least a portion of the first retaining member with the frame to form an interference fit between the first retaining member and the frame; and
sliding an alignment feature of a second gas-generant grain along the retaining feature of the frame to position the second gas-generant grain adjacent to the first gas-generant grain and position the first retaining member between the adjacent first gas-generant grain and second gas-generant grain.

19. A method of generating a gas, the method comprising:
combusting a plurality of longitudinally stacked gas-generant grains to generate a gas;
restricting lateral movement of the plurality of longitudinally stacked gas-generant grains during combustion with a frame structure; and
restricting longitudinal movement of at least some of the plurality of longitudinally stacked gas-generant grains during combustion by maintaining retaining members between adjacent gas-generant grains of the plurality of longitudinally stacked gas-generant grains and maintaining the retaining members fixed relative to the frame structure during combustion.

20. The method of claim 19, wherein combusting a plurality of longitudinally stacked gas-generant grains to generate a gas comprises combusting a plurality of longitudinally stacked gas-generant grains to generate a fire-suppressing gas.

* * * * *